United States Patent
MacLennan et al.

(10) Patent No.: US 11,333,570 B1
(45) Date of Patent: May 17, 2022

(54) LEAK CHECK STRATEGIES AVOIDING HIGH VAPOR GENERATION CONDITIONS

(71) Applicants: DENSO International America, Inc., Southfield, MI (US); DENSO CORPORATION, Kariya (JP)

(72) Inventors: Brandon MacLennan, Southfield, MI (US); Benjamin Palmer, Southfield, MI (US); Kyle Renno, New Baltimore, MI (US); Ashley Justman, Utica, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 17/217,409

(22) Filed: Mar. 30, 2021

Related U.S. Application Data (60) Provisional application No. 63/111,780, filed on Nov. 10, 2020.

(51) Int. Cl.
*G01M 3/02* (2006.01)
*F02D 41/22* (2006.01)
*G01C 21/34* (2006.01)

(52) U.S. Cl.
CPC ............. *G01M 3/025* (2013.01); *F02D 41/22* (2013.01); *G01C 21/3438* (2013.01); *F02D 2041/225* (2013.01)

(58) Field of Classification Search
CPC ... G01M 3/025; F02M 41/22; G01C 21/3438; F02D 2041/225
USPC ........................................................ 701/102
See application file for complete search history.

(56) References Cited

U.S. PATENT DOCUMENTS

| | | | |
|---|---|---|---|
| 6,499,472 B2 | 12/2002 | Weldon et al. | |
| 6,553,975 B2 | 4/2003 | Weldon et al. | |
| 6,807,851 B2 | 10/2004 | Wakahara et al. | |
| 9,284,924 B2 | 3/2016 | Dudar et al. | |
| 9,291,128 B2 | 3/2016 | Dudar | |
| 9,890,744 B2 | 2/2018 | Li | |
| 10,690,082 B2 | 6/2020 | Dudar | |
| 2016/0040630 A1* | 2/2016 | Li | F02M 25/0809 73/40.5 R |
| 2017/0122841 A1* | 5/2017 | Dudar | G01M 17/00 |
| 2018/0179993 A1* | 6/2018 | Dudar | F02D 41/004 |
| 2018/0361820 A1* | 12/2018 | Dudar | B60H 1/0075 |

(Continued)

FOREIGN PATENT DOCUMENTS

| | | |
|---|---|---|
| EP | 0789836 B1 | 8/1997 |
| JP | 2001152974 A * | 6/2001 |

*Primary Examiner* — Mahmoud Gimie
(74) *Attorney, Agent, or Firm* — Harness, Dickey & Pierce, P.L.C.

(57) ABSTRACT

A control system for a vehicle includes a controller. The controller is configured to receive signals from a plurality of vehicle sensors, a vehicle communications system, a ride-share application, a navigation system, or a combination of these. The controller is configured to determine whether at least one of a plurality of conditions is met to execute a small leak test on a fuel system of the vehicle based on the signals, where the plurality of conditions include an available time segment to execute the small leak test, a level surface, a smooth surface, and a constant vehicular momentum. The controller is configured to execute the small leak test when at least one of the plurality of conditions is met.

16 Claims, 6 Drawing Sheets

(56) References Cited

U.S. PATENT DOCUMENTS

| | | | |
|---|---|---|---|
| 2019/0017453 A1* | 1/2019 | Dudar | F02D 41/0037 |
| 2019/0040822 A1* | 2/2019 | Dudar | F02M 25/0836 |
| 2019/0108693 A1* | 4/2019 | Dudar | B60K 15/077 |
| 2019/0186422 A1* | 6/2019 | Dudar | B60K 15/03504 |
| 2019/0376869 A1* | 12/2019 | Dudar | G01M 3/007 |
| 2020/0003143 A1 | 1/2020 | Dudar | |
| 2020/0141339 A1* | 5/2020 | Dudar | B60W 20/40 |
| 2020/0172088 A1* | 6/2020 | Dudar | B60W 30/06 |
| 2020/0393258 A1* | 12/2020 | Leone | G07C 5/0816 |

* cited by examiner

LEAK CHECK STRATEGIES AVOIDING HIGH VAPOR GENERATION CONDITIONS

CROSS-REFERENCE TO RELATED APPLICATIONS

This application claims the benefit of U.S. Provisional Application No. 63/111,780, filed on Nov. 10, 2020. The entire disclosure of the above application is incorporated herein by reference.

FIELD

The present disclosure relates to leak check strategies for automobile fuel systems, and, more specifically, to leak check strategies avoiding high vapor generation conditions.

BACKGROUND

This section provides background information related to the present disclosure which is not necessarily prior art.

Automotive vehicles include evaporative emission control (EVAP) systems. The EVAP system manages fuel vapor and must be checked for fuel vapor leaks. The federal standard prohibits leaks equivalent to a 0.020 inch diameter hole or larger. The requirements for running the EVAP monitor may vary depending on the vehicle. Generally speaking, the fuel tank must be ½-¾ full, the ambient outside temperature must not be too hot or too cold (for example greater than 95° F. or less than 30° F.), the vehicle must have met engine cold start conditions (for example, sat overnight or for at least 8 hours without being driven; engine coolant temperature is less than or equal to 12° F. higher than ambient temperature, etc.), the vehicle must have been driven for a minimum number of minutes (for example 10 minutes) within a speed range (for example 45-65 mph), the components in the EVAP control system must be functioning normally, and there must not be any fault codes.

New challenges have arisen for performing leak checks on vehicles when an engine-off time is limited, such as in autonomous vehicles and ride-share vehicles. Performing small leak checks require a very stable system and usually a long amount of time after the engine turns off to reach system stability. This presents a significant challenge for autonomous and ride-share vehicles that may not have enough engine-off time to complete the small leak check.

SUMMARY

This section provides a general summary of the disclosure, and is not a comprehensive disclosure of its full scope or all of its features.

A control system for a vehicle includes a controller. The controller is configured to receive signals from a plurality of vehicle sensors, a vehicle communications system, a ride-share application, a navigation system, or a combination of these. The controller is configured to determine whether at least one of a plurality of conditions is met to execute a small leak test on a fuel system of the vehicle based on the signals, where the plurality of conditions include an available time segment to execute the small leak test, a level surface, a smooth surface, and a constant vehicular momentum. The controller is configured to execute the small leak test when at least one of the plurality of conditions is met.

The controller may be configured to receive the output signals from the plurality of vehicle sensors and determine whether the vehicle is level.

The controller may be configured to determine a new location that meets a predetermined location condition based on signals from the navigation system when the vehicle is not level and to either control operation of the vehicle to drive the vehicle to the new location or send a communication to a vehicle operator to drive the vehicle to the new location. The controller may be configured to execute the small leak test when the vehicle is at the new location.

The controller may be configured to receive the output signals from the vehicle communication sensor and determine whether a stop time of the vehicle exceeds a predetermined time threshold.

The controller may be configured to execute the small leak test when the stop time of the vehicle exceeds the predetermined time threshold.

The output signals from the vehicle communication sensor may indicate communication with a traffic light, a train stop, or a combination of these.

The output signals from the vehicle communication sensor may indicate communication with an infrastructure, a network, a remote vehicle, or a combination of these.

The controller may be configured to receive the output signals from the ride-share application and determine whether a stop time of the vehicle exceeds a predetermined time threshold.

The controller may be configured to execute the small leak test when the stop time of the vehicle exceeds the predetermined time threshold.

The output signals from the ride-share application may indicate a pickup time and pickup location for a fare.

The controller may be configured to send a signal to the ride-share application indicating an extension for the pickup time when the stop time of the vehicle does not exceed the predetermined time threshold.

An example method for controlling a vehicle according to the present disclosure includes: receiving, by a controller, signals from a plurality of vehicle sensors, a vehicle communications system, a ride-share application, a navigation system, or a combination of these; determining, by the controller, whether at least one of a plurality of conditions are met to execute a small leak test on a fuel system of the vehicle based on the signals the plurality of conditions including an available time segment to execute the small leak test, a level surface, a smooth surface, and a constant vehicular momentum; and executing, by the controller, the small leak test based on at least one of the plurality of conditions being met to execute the small leak test.

The example method may include determining, by the controller, whether the vehicle is level based on receiving the output signals from the plurality of vehicle sensors.

The example method may include: determining, by the controller, a new location meeting a predetermined location condition based on signals from the navigation system; either controlling, by the controller, operation of the vehicle to drive the vehicle to the new location or sending, by the controller, a communication to a vehicle operator to drive the vehicle to the new location; and executing, by the controller, the small leak test when the vehicle is at the new location.

The example method may include determining, by the controller, whether a stop time of the vehicle exceeds a predetermined time threshold based on the output signals from the vehicle communication sensor.

The example method may include executing, by the controller, the small leak test when the stop time of the vehicle exceeds the predetermined time threshold.

The output signals from the vehicle communication sensor may indicate communication with a traffic light, a train stop, an infrastructure, a network, a remote vehicle, or a combination of these.

The example method may include: determining, by the controller, whether a stop time of the vehicle exceeds a predetermined time threshold based on output signals from the ride-share application; and executing, by the controller, the small leak test when the stop time of the vehicle exceeds the predetermined time threshold.

The output signals from the ride-share application may indicate a pickup time and pickup location for a fare.

The example method may include sending, by the controller, a signal to the ride-share application indicating an extension for the pickup time when the stop time of the vehicle does not exceed the predetermined time threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

As people become more environmentally conscious, and automobiles become more advanced, ride-sharing between people, particularly using autonomous vehicles, has become more common. The ride-share vehicles often run non-stop or only have short stops throughout the day before receiving new ride requests. The lack of stops or short stops do not provide adequate time for vehicle systems, such as the evaporative emission control (EVAP) system, to run federally required tests.

The EVAP system and/or the EVAP system in conjunction with a Powertrain Control Module (PCM) tests the integrity of the fuel system and its ability to draw fuel vapor into the engine for combustion. Particularly, a leak portion of the test may check for fuel vapor leaks, and, more specifically, for leakage rates equivalent to a 0.020 inch diameter hole or greater (i.e., small leak check). The leak detection test may be activated under a specific set of engine and vehicle operating conditions. For example, the components in the EVAP control system must be functioning normally and there must not be any fault codes for the leak detection test to be activated. Additionally, one or more of the following vehicle operating conditions may also need to be met: the fuel tank must be ½-¾ full, the ambient outside temperature must not be too hot or too cold (for example greater than 95° F. or less than 30° F.), the vehicle must meet engine cold start conditions (for example, sat overnight or for at least 8 hours without being driven; engine coolant temperature is less than or equal to 12° F. higher than ambient temperature, etc.), the vehicle must have been started and driven for a minimum number of minutes (for example 10 minutes) within a speed range (for example 45-65 mph), the vehicle must perform an extended idle during the drive cycle (for example, idle for 30 seconds), and the vehicle must be shut down for a minimum number of minutes after the cold start and drive.

Fuel system leak checks in automobiles have continuously evolved as new challenges arise. One of the more recent challenges is performing 0.020 inch leak checks (i.e., small leak checks) on vehicles when engine-off time is limited with the evolution of autonomous vehicles and ride-share. Performing small leak checks requires a very stable system and usually a long amount of time after the engine turns off to reach system stability. This presents a significant challenge for autonomous and ride-share vehicles that may not have enough engine-off time to complete the small leak checks. With special vehicle control and leak check timing the vehicle may be provided the right opportunities to complete leak checks. For example, a vehicle may be programmed to drive to an undisturbed location for a predetermined time to complete a leak check. Alternatively, when the vehicle is stopped for a certain amount of time, a leak check may be programmed to start.

The control system of the present disclosure may implement one or more alternative methods to create a stable environment, which avoids high vapor generation from fuel movement, to run small leak checks with limited engine-off time, particularly applicable in autonomous vehicles and ride-sharing. For example, the vehicle may be programmed or controlled to drive to an undisturbed location and execute a leak check by any means, including turning the engine off to complete the leak check.

Alternatively a vehicle may communicate with an infrastructure in a traffic light, train stop, or other stop location. If the vehicle receives information that the car may be resting equal to or greater than a predetermined amount of time, a leak check may be executed by any means, including turning the engine off to complete the leak check.

Alternatively a vehicle may communicate with other road infrastructure, for example on a highway, to understand upcoming road conditions that may cause vehicular momentum adjustment, including traffic, potholes, turns in highway, cruise control, etc. The vehicle may use a predetermined momentum change threshold to judge if there will be too much momentum change, generating fuel slosh and thus vapor generation. If conditions are met, a leak check may be executed by any means, including turning the engine off if there are electric motors available to maintain vehicle speed.

The vehicle may communicate with application users to understand location and determine if a leak check may be executed by any means, including turning the engine off to complete the leak check. For example, a vehicle may communicate via a ride-share application to understand users distance from the vehicle and determine if a leak check can be ran before the user arrives to the vehicle. Alternatively, the vehicle may utilize application communications to schedule a window of time to run the leak check.

Where communications with other vehicles and/or infrastructure are utilized, a dedicated short range communications (DSRC) radio, a cellular-V2X (C-V2X) radio, or any other communications radio, may communicate vehicle-to-vehicle (V2V), vehicle-to-infrastructure (V2I), vehicle-to-pedestrian (V2P), or vehicle-to-network (V2N), collectively referred to as vehicle-to-everything (V2X).

Figure 1:
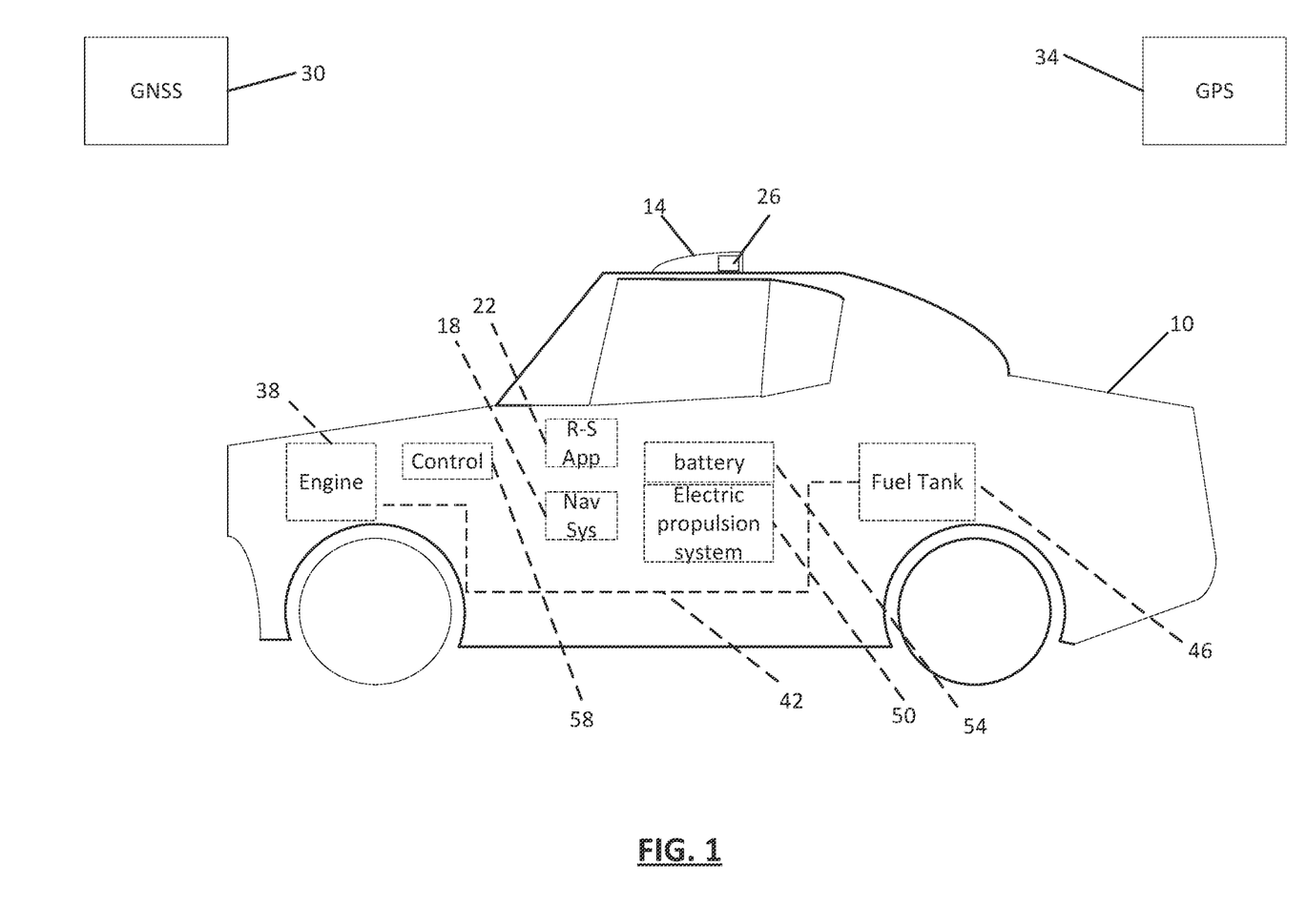
FIG. 1 is a schematic drawing of an example vehicle according to the present disclosure.

Now, referring to FIG. 1, a vehicle 10, or host vehicle (HV), may be equipped with one or more of a vehicle communications system (for example only, a dedicated short range communication (DSRC) system or a cellular-V2X (C-V2X) system) 14, a navigation system 18, and a ride-share application 22. While the vehicle 10 is described as being equipped with a DSRC system or a C-V2X system, in other embodiments, the vehicle 10 may be equipped with any vehicle communications system utilizing an antenna for transmitting information. Through the DSRC or C-V2X system 20, the vehicle 10 may be capable of vehicle-to-vehicle (V2V), vehicle-to-infrastructure (V2I), vehicle-to-pedestrian (V2P), and vehicle-to-network (V2N), collectively referred to as vehicle-to-everything (V2X), communications.

The vehicle 10 may be driven by an operator or may be an autonomous vehicle. For purposes of this disclosure, in the case of an autonomous vehicle, the autonomous vehicle is a vehicle that may be operated by a control system of the vehicle, based on various inputs supplied by a vehicle operator, a navigation system, a vehicle communication system, vehicle sensors, etc., such as a destination, a vehicle route, road conditions, traffic conditions, a peripheral view, etc. For purposes of this disclosure, any known autonomous vehicle control system is applicable, as the disclosure is not focused on the autonomous control of the vehicle, and would be applicable for any autonomously controlled vehicle.

The vehicle communications system 14 may be configured to transmit and receive signals representing, for example, early warnings of accidents and driving hazards to/from remote vehicles that are also equipped with V2X systems and/or to/from an infrastructure communication location equipped with a V2X system. Additionally, the vehicle communications system 14 may be configured to predict future accidents and driving hazards based on communication with remote vehicles and/or infrastructure communication locations that are also equipped with V2X systems by calculating the current and future positions of the vehicle 10.

The vehicle communications system 14 may include an antenna 26 (for example only, a 5.9 GHz DSRC antenna, a 5G cellular antenna, or any other communications antenna) which receives information from Global Network Satellite Systems (GNSS) 30 and/or Global Positioning Systems (GPS) 34, which communicate with the vehicle communications system 14, along with Basic Safety Messages (BSM) periodically transmitted by other vehicles, infrastructure, pedestrians, networks, etc., containing the current position, position accuracy, speed, heading, brake status, and other vehicle infrastructure, pedestrian, network, etc., information. The SAE J2735 document defines the BSMs that may be utilized and the frequency and power with which the BSMs are transmitted. With V2X technology, vehicles can have improved safety by knowing more about the other surrounding vehicles, infrastructure, pedestrians, etc.

The vehicle communications system 14 may communicate with the other vehicles, infrastructure, pedestrians, networks, etc., equipped with a V2X system, for example, through the antenna 26 by using, for example, a 75 MHz band around a 5.9 GHz signal. While a 75 MHz band around a 5.9 GHz signal is provided as an example embodiment, it is understood that the vehicle communications system 14 may communicate with the other vehicles, pedestrians, infrastructures, networks, etc., by any method including at signals other than the 5.9 GHz signal, such as with a 5G cellular signal or any other communications signal. The vehicle communications system 14 may operate in both line-of-sight (LOS) and non-line-of-sight (NLOS) conditions, thereby allowing the vehicle communications system 14 to receive communications from other vehicles and infrastructures related to warnings and driving hazards, even with blockage from intervening vehicles, blind corners, or other roadside infrastructure.

All of the components of the vehicle communications system 14 may be located at one or multiple locations on the roof of the vehicle. Alternatively, some of the components may be located in the interior of the vehicle 10. While the vehicle communications system 14 is illustrated as being located on the roof of the vehicle 10, in some embodiments, the vehicle communications system 14, and any or all of its components, may be disposed at any location on the vehicle 10 to include the front, rear, sides, and internal to the vehicle 10.

The vehicle 10 may be an autonomous vehicle, a ride-share vehicle, or a combination of these. The vehicle 10 may utilize the navigation system 18 to understand vehicle routes and infrastructure. The navigation system 18 may communicate with the GPS 34 through the antenna 26 and utilize internally stored maps to plot drive routes. The navigation system 18, the V2X communications, or a combination of these, may provide information regarding traffic delays, such as stop lights, train crossings, accidents, road closures, heavy traffic, etc.

The vehicle 10 may utilize the ride-share application 22 for scheduling rides. Users may request rides through the ride-share application on their devices, and the ride-share application may communicate the rides with the vehicle 10. The vehicle may have an opportunity to accept or decline rides, or the vehicle may have the opportunity to adjust a pick-up time for a ride. The ride-share application 22 may additionally provide a schedule of rides, pick-up locations and times, and drop-off locations and times for the vehicle 10 during a predetermined time period (for example, 8 hours, 24 hours, 1 week, etc.).

The vehicle 10 may additionally include, among other systems, an engine 38 and fuel system 42. The fuel system 42 may provide fuel from a fuel tank 46 to the engine 38 for use in propelling the vehicle 10. For example, the engine 38 may be an internal combustion engine 38 that burns fuel from the fuel system 42 to propel the vehicle 10.

In addition to the fuel system 42, the vehicle 10 may include an electric propulsion system 50 having a battery 54 that provides electricity for propelling the vehicle 10. Under some operating conditions, the electric propulsion system 50 may work with the engine 38 to propel the vehicle 10.

The communication system 14, the navigation system 18, the ride-share application 22, the engine 38, the fuel system 42, and the electric propulsion system 50 may communicate with a controller 58. The controller 58 may evaluate system inputs and make determinations for vehicle control based on the system inputs.

Figure 2:
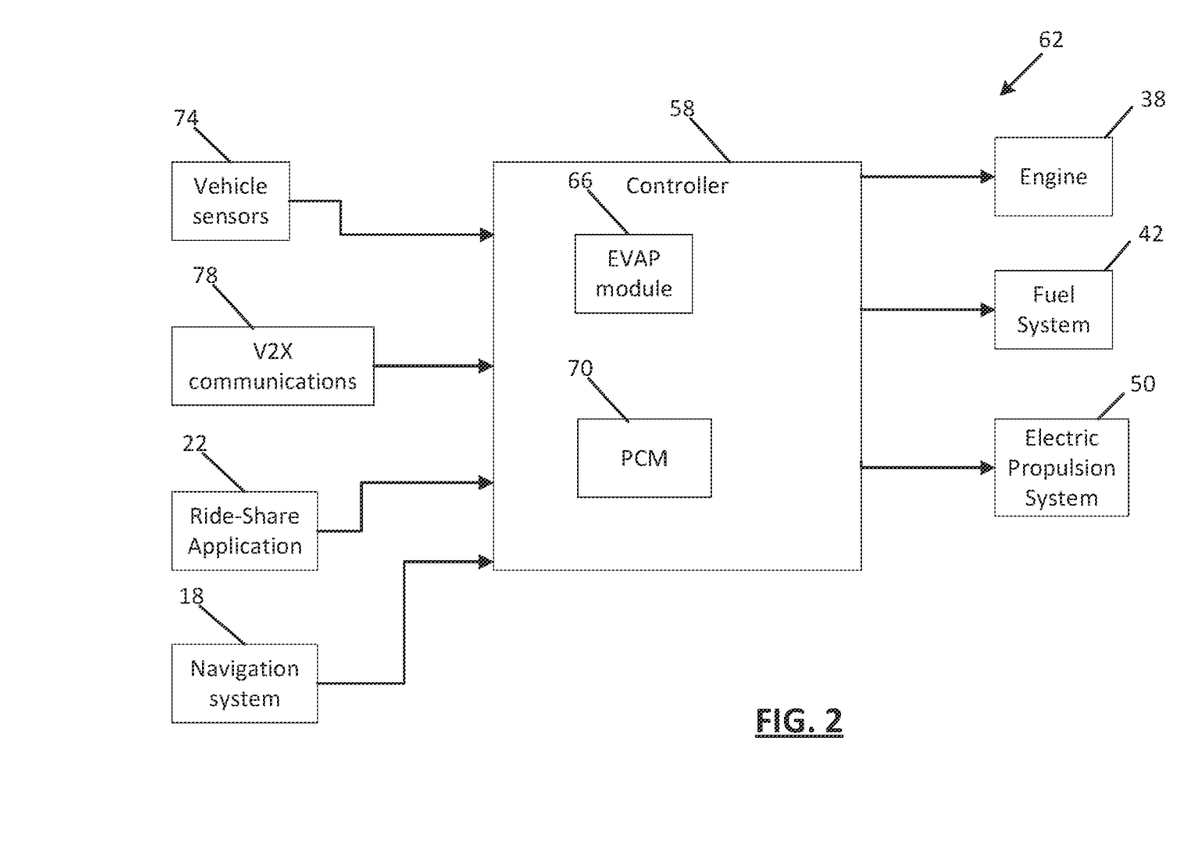
FIG. 2 is a schematic drawing of an example control system for the vehicle of FIG. 1.

Referring to FIG. 2, a control system 62 for the vehicle 10 is illustrated. The controller 58 may be a control module or a control circuit that receives various inputs, makes determinations based on the inputs and/or stored data, and provides commands to various systems and parts for controlling the vehicle 10. In this application, the term "module" or "unit" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The controller 58 may include, among other modules, an evaporative emission control (EVAP) module 66 and a powertrain control module (PCM) 70. The EVAP module 66 may be in communication with the PCM 70 to control, for example, the vehicle 10 and perform a federally regulated leak test. The EVAP module 66 and PCM 70 may test the integrity of the fuel system and its ability to draw fuel vapor into the engine for combustion. Particularly, a leak detection portion of the test may check for fuel vapor leaks, and, for example, for leakage rates equivalent to a 0.020 inch diameter hole or greater (i.e., small leak check). The leak detection test may be activated under a specific set of engine and vehicle operating conditions. For example, one or more of the following conditions may be required: the components in the EVAP control system must be functioning normally; there must not be any fault codes; the fuel tank must be ½-¾ full; the ambient outside temperature must not be too hot or too cold (for example greater than 95° F. or less than 30° F.); the vehicle must meet engine cold start conditions (for example, sat overnight or for at least 8 hours without being driven; engine coolant temperature is less than or equal to 12° F. higher than ambient temperature, etc.); the vehicle must have been started and driven for a minimum number of minutes (for example 10 minutes) within a speed range (for example 45-65 mph); the vehicle must be shut down for a minimum number of minutes after the cold start and drive (for example, 45 minutes or more); the fuel system must be stable (for example, no fuel slosh and no vapor generation); and the vehicle must perform an extended idle during the drive cycle (for example, idle for 30 seconds).

The controller 58 may be in communication with vehicle sensors 74. For example, the controller 58 may receive output from a vehicle speed sensor, temperature sensors, fuel pressure sensors, other fuel system sensors, engine sensors, electric propulsion system sensors, and other vehicle sensors. The controller 58 may determine current vehicle conditions from the output of the vehicle sensors 74. Additionally, or alternatively, the controller 58 may determine control signals for the systems in the vehicle 10 based on the output of the vehicle sensors 74.

For example, the EVAP module 66 may receive fuel tank fill level, fault codes, ambient outside temperature, engine-off time, engine drive time, vehicle speed, cold start condition, vapor detection in the fuel tank, idle time, fuel pressure, etc., from the vehicle sensors 74. The EVAP module 66 may use the inputs from the vehicle sensors 74 to determine conditions for the small leak fuel system test. For example, the EVAP module 66 may evaluate the fuel tank fill level signal to determine if the fuel tank is filled above a threshold (for example, within a range of ½ to ¾ filled). The EVAP module 66 may evaluate the fault codes signal to determine whether there are any fault codes. The EVAP module 66 may evaluate the output of the ambient outside temperature sensor to determine whether the ambient temperature is within a threshold temperature range (for example, greater than 30° F. and less than 95° F.). The EVAP module 66 may evaluate the engine-off time signal and/or an output of a cold start condition sensor to determine whether the vehicle 10 has been shut down for a threshold number of hours (for example at least 8 hours) to trigger a cold start condition and to determine whether the vehicle has been shut down for a minimum number of minutes after the cold start and drive (for example, 45 minutes or more). The EVAP module 66 may evaluate the engine drive time signal to determine whether the vehicle has been started and driven for a minimum number of minutes (for example 10 minutes). The EVAP module 66 may evaluate the output of the vehicle speed sensor to determine whether the vehicle speed is within a speed range (for example 45-65 mph). The EVAP module 66 may evaluate an output of a fuel vapor signal in the fuel tank to determine whether the fuel system is stable (for example, no fuel slosh and no vapor generation). The EVAP module 66 may evaluate the output of the vehicle speed sensor, the engine drive time signal, and the gear selection signal to determine whether the vehicle has completed an extended idle during the drive cycle (for example, idle for 30 seconds).

The controller 58 may also, or alternatively, be in communication with a V2X system 78. The V2X system 78 may send and receive communications including vehicle-to-vehicle (V2V) communications, vehicle-to-infrastructure (V21) communications, vehicle-to-pedestrian (V2P) communications, and vehicle-to-network (V2N) communications, collectively referred to as vehicle-to-everything (V2X) communications, for example through the antenna 26. For example, the controller 58 may receive V2X communications and may determine current vehicle driving conditions from the output of the V2X system 78. Additionally, or alternatively, the controller 58 may determine control signals for the systems in the vehicle 10 based on the output of the V2X system 78.

For example, the EVAP module 66 may receive data for traffic signals, train crossings, accidents, driving conditions, traffic conditions, road conditions, or other conditions that may affect vehicle driving or traffic from the V2X system 78. The EVAP module 66 may evaluate the output from the V2X system 78 and determine whether traffic conditions or driving conditions allow for completion of the small leak test. For example, if the EVAP module 66 receives a signal from the V2X system 78 indicating that the vehicle 10 will be stopped at a train track or stopped at an accident for a period of time longer than a threshold time, the EVAP module 66 may indicate to the PCM 70 to run the small leak test. Alternatively, or additionally, for example, if the EVAP module 66 receives an output from the V2X system 78 that the road is smooth and straight for a threshold number of miles (such that there is not likely to be fuel slosh or vapor generation), and the vehicle 10 includes the electric propulsion system 50, the EVAP module 66 may indicate to the PCM 70 to electrically power the vehicle 10, shut down the gas engine, and run the small leak test.

The controller 58 may also, or alternatively, be in communication with the ride-share application 22. The ride-share application 22 may send and receive communications with a remote system for scheduling and navigating ride-share fares. For example, the controller 58 may receive ride-share application 22 communications and may determine whether there is time for a stop to run the small leak test.

For example, the EVAP module 66 may receive communications from the ride-share application 22 scheduling a new fare. The EVAP module 66 may evaluate the timing of the new fare and determine if it is greater than a time threshold. If so, the EVAP module 66 may indicate to the PCM 70 to run the small leak test. The EVAP module 66 may receive communications from the ride-share application 22 providing a drop off location. The EVAP module 66 may work with the navigation system 18 and the V2X communications 78 to determine whether the vehicle 10 will be stopped or will be driving down a smooth straight road for a threshold amount of time to complete the small leak test. If so, the EVAP module 66 may indicate to the PCM 70 to run the small leak test.

The controller 58 may also, or alternatively, be in communication with the navigation system 18. The navigation system 18 may send and receive communications with the GPS 34 or GNSS 30 for navigating. For example, the controller 58 may receive navigation system 18 communications and may determine whether there is time for a stop to run the small leak test, whether the road is straight (to maintain consistent vehicular momentum and reduce fuel slosh/vapor generation), whether there is a flat surface (as opposed to inclined or declined) nearby to run the small leak test, etc.

For example, the EVAP module 66 may receive communications from the navigation system 18 indicating vehicle route, road conditions, traffic conditions, etc. The EVAP module 66 may evaluate the navigation system 18 communications to determine a drop off time for a ride-share fare, whether the vehicle 10 will be stopped for a threshold time, whether the vehicle 10 will be navigating down a smooth, straight road for a threshold time, etc. If the conditions are correct, the EVAP module 66 may indicate to the PCM 70 to run the small leak test.

The controller 58 may additionally, or alternatively, communicate with the engine 38, the fuel system 42, and the electric propulsion system 50, among other systems and/or parts. For example, the controller 58 may command the engine 38 to shut down, start up, and or idle at a predetermined vehicle speed during the small leak test. The controller 58 may command the fuel system 42 during the small leak test. The controller 58 may command the electric propulsion system 50 to operate the vehicle 10 during the small leak test 50.

For example, the PCM 70 may send signals controlling an engine-off condition, an engine speed (rpm), an engine-on condition, etc., to the engine 38. The PCM 70 may send signals controlling an air-fuel-ratio, a fueling state, etc., to the fuel system 42. The PCM 70 may send signals controlling the system-on state, the system-off state, the drive state, the battery power supply, the vehicle speed, etc., to the electric propulsion system 50.

Figure 3:
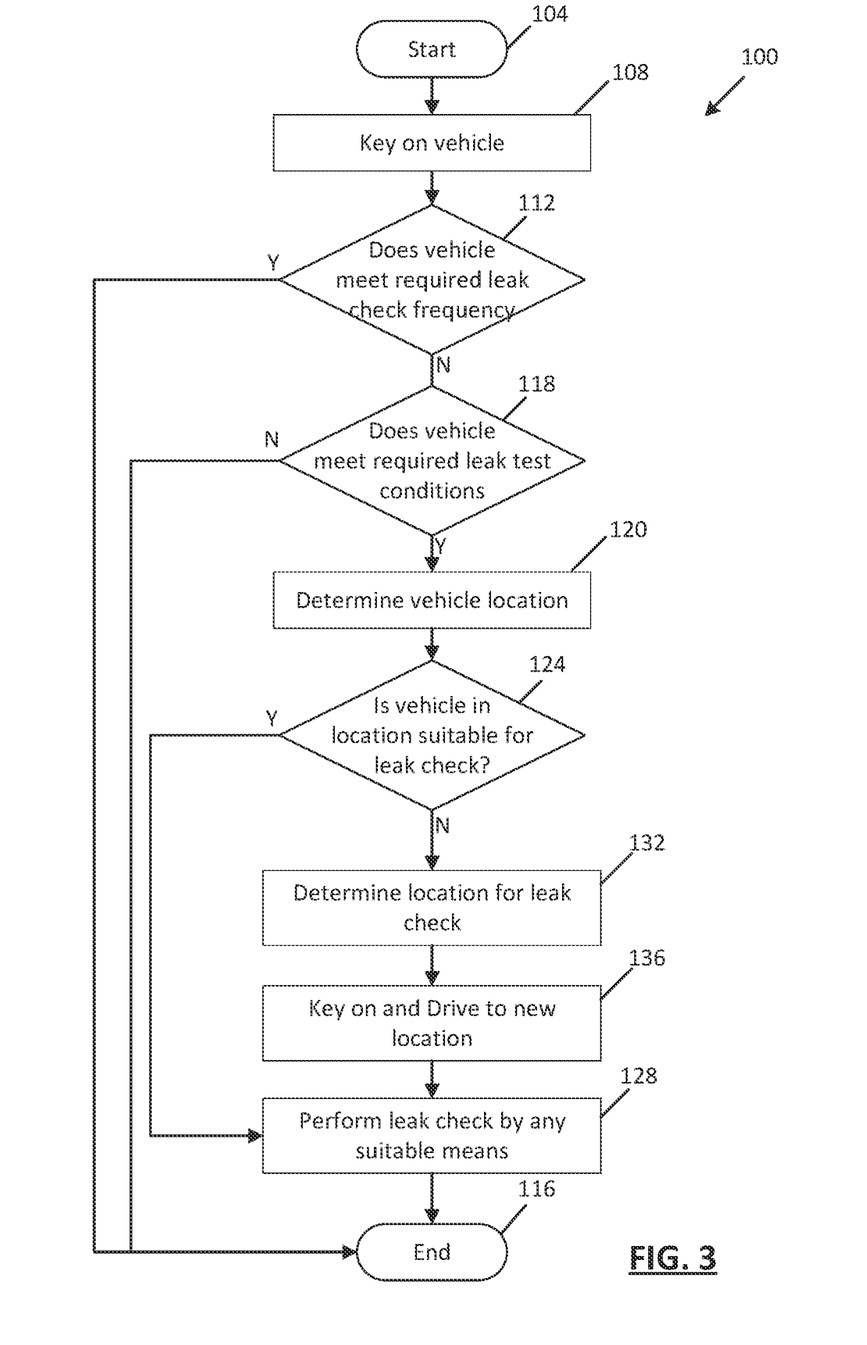
FIG. 3 is a flowchart for an example method of controlling the vehicle of FIG. 1.

Now referring to FIG. 3, an example method 100 for performing a leak check is illustrated. Method 100 begins at 104. At 104, the vehicle 10 is keyed-off. At 108, the vehicle 10 is keyed-on. The vehicle 10 key-on may include turning the accessories on in the vehicle or starting the engine.

At 112, the controller 58 determines whether the vehicle 10 meets the required leak check frequency. For example, the required leak check frequency may be federally regulated, vehicle manufacturer regulated, or a combination of these. For example, the required leak check frequency may be 26% of qualifying trips (per CARB OBD2 regulation).

If true at 112, method 100 may end at 116. If false at 112, the method 100 determines whether the vehicle 10 meets the required small leak test conditions at 118. For example, the conditions may include: the fuel tank must be ½-¾ full, the ambient outside temperature must not be too hot or too cold (for example greater than 95° F. or less than 30° F.), the vehicle must have met engine cold start conditions (for example, sat overnight or for at least 8 hours without being driven; engine coolant temperature is less than or equal to 12° F. higher than ambient temperature, etc.), the vehicle must have been driven for a minimum number of minutes (for example 10 minutes) within a speed range (for example 45-65 mph), the components in the EVAP control system must be functioning normally, there must not be any fault codes, or a combination thereof. If false, method 100 ends at 116.

If true at 118, method 100 may determine a vehicle location at 120. For example, the controller 58 may communicate with the navigation system 18 to determine the vehicle location. The navigation system 18 may determine vehicle location from the GPS 34 or GNSS 30, for example.

At 124, method 100 may determine whether the vehicle 10 is in a location suitable for a leak check. For example, the controller 58 may communicate with the navigation system 18, the vehicle sensor 74, the V2X communication system 78, or combination of these, to determine whether the vehicle 10 meets a predetermined environmental condition, such as whether the vehicle 10 is on a level surface (as opposed to an incline or decline), is away from other traffic and in a location to be parked, is in indirect sunlight, is in a stable environmental condition, or any other location conditions.

If true at 124, the method 100 may perform the leak check by any suitable means at 128. For example, the controller 58 may shut the engine 38 off for a predetermined time (such as 30 minutes or more). The controller 58 may then restart the engine 38 and command the engine 38 to idle at a predetermined speed (for example, within a range of 400-800 RPM) for a predetermined idle time (for example, 10 minutes or more). During the engine idle time, the controller 58 may execute the small leak test.

For example, the small leak test may detect leaks by pressurizing a fuel tank system. Alternatively, the small leak test may detect leaks by applying a vacuum to the fuel tank system.

If false at 124, the method 100 may determine a new location suitable for executing the small leak test at 132. For example, the new location may meet the predetermined environmental condition, such as be level (as opposed to on an incline or decline), be suitable for parking (out of the flow of traffic), be in indirect sunlight, be in a stable environmental condition, or any other location conditions. The controller 58 may communicate with the navigation system 18 and the V2X communication system 78 to determine the new location. For example, the navigation system 18 may provide the vehicle location. The V2X communication system 78 may ping infrastructure within a radius (for example within a five-mile radius) for a location meeting the predetermined environmental condition, such as a level surface, outside of the flow of traffic, in indirect sunlight, in a stable environmental condition, or any other location conditions.

At 136, the vehicle 10 is keyed-on and/or driven to the new location. For example, the controller 58 may provide coordinates to the navigation system 18 for display to a vehicle operator. In autonomous vehicles, the controller 58 may communicate with the navigation system 18 and the vehicle control to autonomously drive the vehicle 10 to the new location.

At 128, the leak check may be performed. For example, the controller 58 may execute the small leak test, as previously described.

Method 100 ends at 116.

Figure 4:
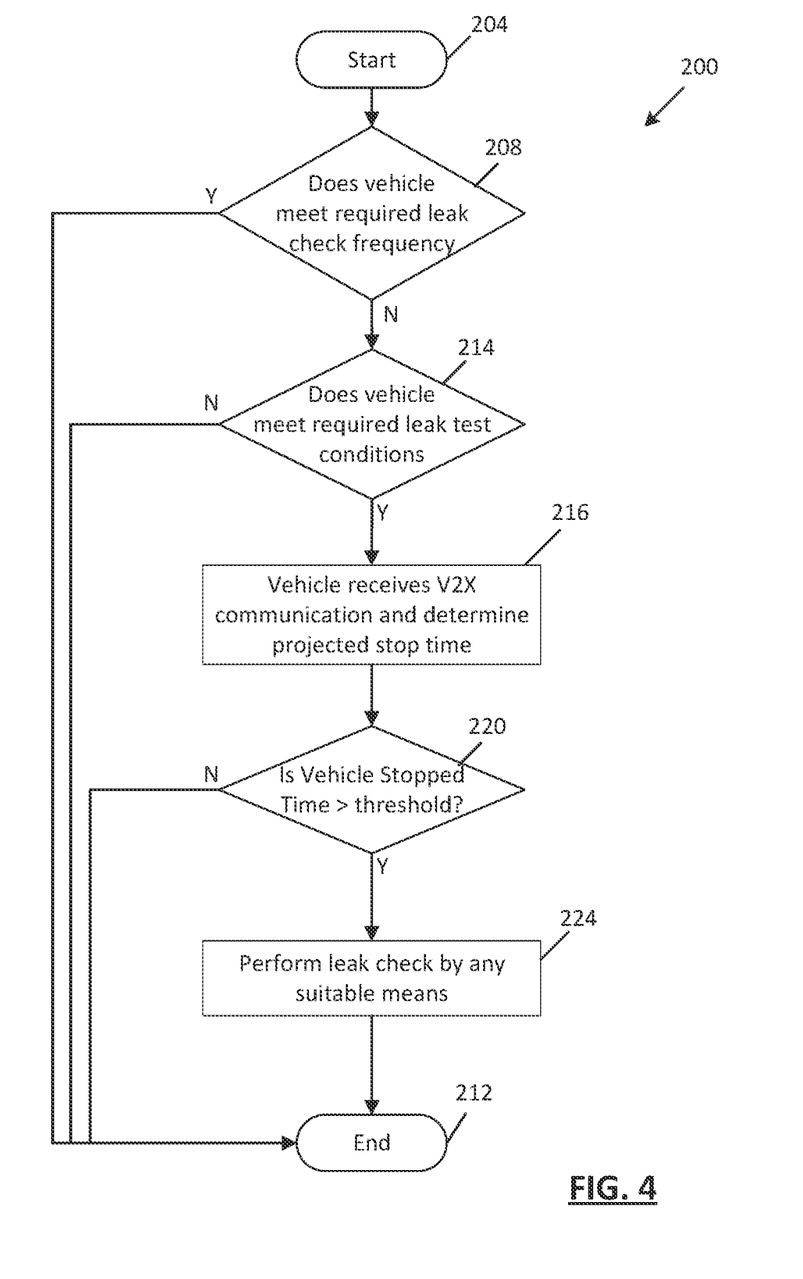
FIG. 4 is a flowchart for another example method of controlling the vehicle of FIG. 1.

Now referring to FIG. 4, an alternative example method 200 for performing a leak check is illustrated. Method 200 begins at 204. At 204, the vehicle 10 is running but stopped (for example at a traffic light, train stop, traffic accident, traffic jam, or other stop).

At 208, the controller 58 determines whether the vehicle 10 meets the required leak check frequency. For example, the required leak check frequency may be federally regulated, vehicle manufacturer regulated, or a combination of these. For example, the required leak check frequency may be 26% of qualifying trips (according to current CARB OBD2 regulations).

If true at 208, method 200 ends at 212. If false at 208, the method 200 determines whether the vehicle 10 meets the required small leak test conditions at 214. For example, the conditions may include: the fuel tank must be ½-¾ full, the ambient outside temperature must not be too hot or too cold (for example greater than 95° F. or less than 30° F.), the vehicle must meet engine cold start conditions (for example, sat overnight or for at least 8 hours without being driven;

engine coolant temperature is less than or equal to 12° F. higher than ambient temperature, etc.), the vehicle must have been driven for a minimum number of minutes (for example 10 minutes) within a speed range (for example 45-65 mph), the components in the EVAP control system must be functioning normally, there must not be any fault codes, or a combination thereof. If false, method 200 ends at 212.

If true at 214, method 200 receives a V2X communication at 216. For example, the controller 58 may ping infrastructure, vehicles, pedestrian, etc., in the vicinity (for example, within a 2-mile radius) to determine the length of the stop (for example, through the antenna 26). The controller 58 may receive an output from the V2X communication system 78 providing details on the length of stop.

For example, if the vehicle 10 is stopped at a traffic light, the V2X communication system 78 may communicate with the communications of the traffic light infrastructure to determine light timing. Based on the stop time, or based on the signal from the traffic light infrastructure, the controller 58 may determine the remaining stop time at the traffic light.

For example, if the vehicle 10 is stopped at a train stop, the V2X communication system 78 may communicate with the train stop infrastructure to determine timing. Based on the signal from the train stop infrastructure (which may include train length, train speed, time until light change, etc.), the controller 58 may determine the remaining stop time at the train stop.

For example, if the vehicle 10 is stopped at a traffic accident, the V2X communication system 78 may communicate with a network communication or a police officer vehicle communication to determine a stop time. The stop time may be based on a severity of the accident, time already stopped, projected time until the accident clears, etc. Based on the signal from the network communication or police officer vehicle communication, the controller 58 may determine the remaining stop time at the accident.

At 220, method 100 may determine whether the remaining stop time is greater than a threshold. For example, the threshold may be 10 minutes or greater. For example, the controller 58 may vary the predetermined threshold based on fuel level.

If false at 220, method 200 ends at 212.

If true at 220, the method 200 may perform the leak check by any suitable means at 224. For example, the controller 58 may shut the engine 38 off for a predetermined time (such as 30 minutes or more). The controller 58 may then restart the engine 38 and command the engine 38 to idle at a predetermined speed (for example, within a range of 400-800 RPM) for a predetermined idle time (for example, 10 minutes or more). During the engine idle time, the controller 58 may execute the small leak test, as previously described.

Method 200 ends at 116.

Figure 5:
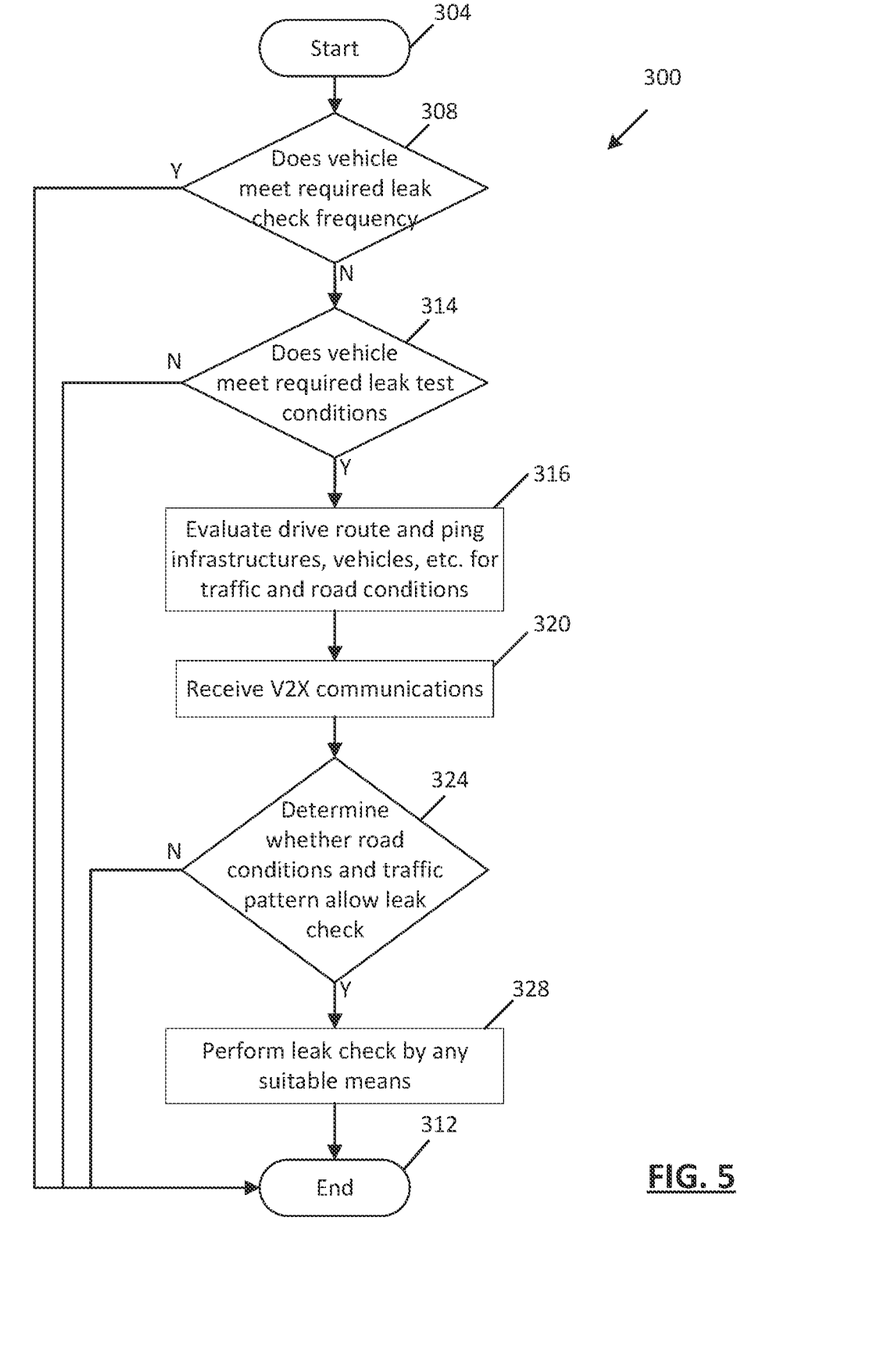
FIG. 5 is a flowchart for another example method of controlling the vehicle of FIG. 1.

Now referring to FIG. 5, an alternative example method 300 for performing a leak check is illustrated. Method 300 begins at 304. At 304, the vehicle 10 is started and driving.

At 308, the controller 58 determines whether the vehicle 10 meets the required leak check frequency. For example, the required leak check frequency may be federally regulated, vehicle manufacturer regulated, or a combination of these. For example, the required leak check frequency may be 26% of qualifying trips (according to current CARB OBD2 regulations).

If true at 308, method 300 ends at 312. If false at 308, the method 300 determines whether the vehicle 10 meets the required small leak test conditions at 314. For example, the conditions may include: the fuel tank must be ½-¾ full, the ambient outside temperature must not be too hot or too cold (for example greater than 95° F. or less than 30° F.), the vehicle must meet engine cold start conditions (for example, sat overnight or for at least 8 hours without being driven; engine coolant temperature is less than or equal to 12° F. higher than ambient temperature, etc.), the vehicle must have been driven for a minimum number of minutes (for example 10 minutes) within a speed range (for example 45-65 mph), the components in the EVAP control system must be functioning normally, there must not be any fault codes, or a combination thereof. If false, method 300 ends at 312.

If true at 314, method 300 may evaluate a drive route and ping infrastructures, vehicles, networks, pedestrians, etc., for traffic and road conditions along the drive route at 316. For example, the controller 58 may communicate with the navigation system 18 to determine the drive route. The navigation system 18 may determine vehicle location and drive route from the GPS 34 or GNSS 30 and stored maps, for example. The V2X communications system 78 may ping the infrastructures, vehicles, networks, pedestrians, etc., along the drive route for traffic and road conditions, for example, through antenna 26.

At 320, method 300 may receive communications from infrastructure, vehicles, pedestrians, and networks along the drive route. For example, the V2X communication system 78 may receive system messages from the infrastructure-to-vehicle, V2V, pedestrian-to-vehicle, or network-to-vehicle, collectively X2X, systems indicating the traffic and road conditions. For example, the communications may indicate locations of potholes, rough pavement, uneven pavement, inclines and declines, road humps, bends, turns, etc., in the road. The communications may additionally, or alternatively, include vehicle frequency, average vehicle speeds, vehicle concentrations, speed limits, traffic lights, train stops, traffic accidents, etc.

At 324, method 300 may determine whether the road conditions and traffic conditions are suitable for execution of the small leak test. For example, the controller 58 may communicate with the navigation system 18, the V2X communication system 78, or a combination of these, to determine whether the road condition is sufficiently smooth and level without bends and whether the traffic condition is consistently moving at or near the posted speed limit or the current vehicle speed. The sufficiency determination may be based on whether the traffic conditions and road conditions support consistent vehicular momentum which leads to fuel slosh levels less than a predetermined threshold and vapor generation less than a predetermined threshold in the fuel tank 46. For example, the fuel level in the fuel tank 46 may not fluctuate more than the predetermined threshold (for example, within a range of 5%-10%) and the vapor in the fuel tank 46 may not increase by more than the predetermined threshold (for example, within a range of 5%-10%). For example, pressure in the fuel vapor space may not fluctuate more than a predetermined pressure (for example, more than 5 kPa).

For example, the road condition may be sufficiently smooth and level without bends if the incline or decline of the road does not change more than 5% over a 2 mile stretch, if there are no turns greater than 25°, if there are fewer potholes than a range of 0-2 per 2 miles, if there are no rough pavement conditions, if there are no uneven pavement conditions, and if there are no road humps. For example, the traffic condition may be sufficient for the small leak test if the average vehicle speed is not less than the current vehicle speed for the vehicle 10 or is not less than the posted speed limit, and there are no traffic lights, train stops, or accidents.

If false at 324, method 300 ends at 312.

If true at 324, the method 300 may perform the leak check by any suitable means at 328. For example, the controller 58 may shut the engine 38 off for a predetermined time (such as 30 minutes or more) and command the electric propulsion system 50 to propel the vehicle 10. The controller 58 may then restart the engine 38 and command the engine 38 to idle at a predetermined speed (for example, within a range of 400-800 RPM) for a predetermined idle time (for example, 10 minutes or more). During the engine idle time, the controller 58 may execute the small leak test, as previously described.

Method 300 ends at 312.

Figure 6:
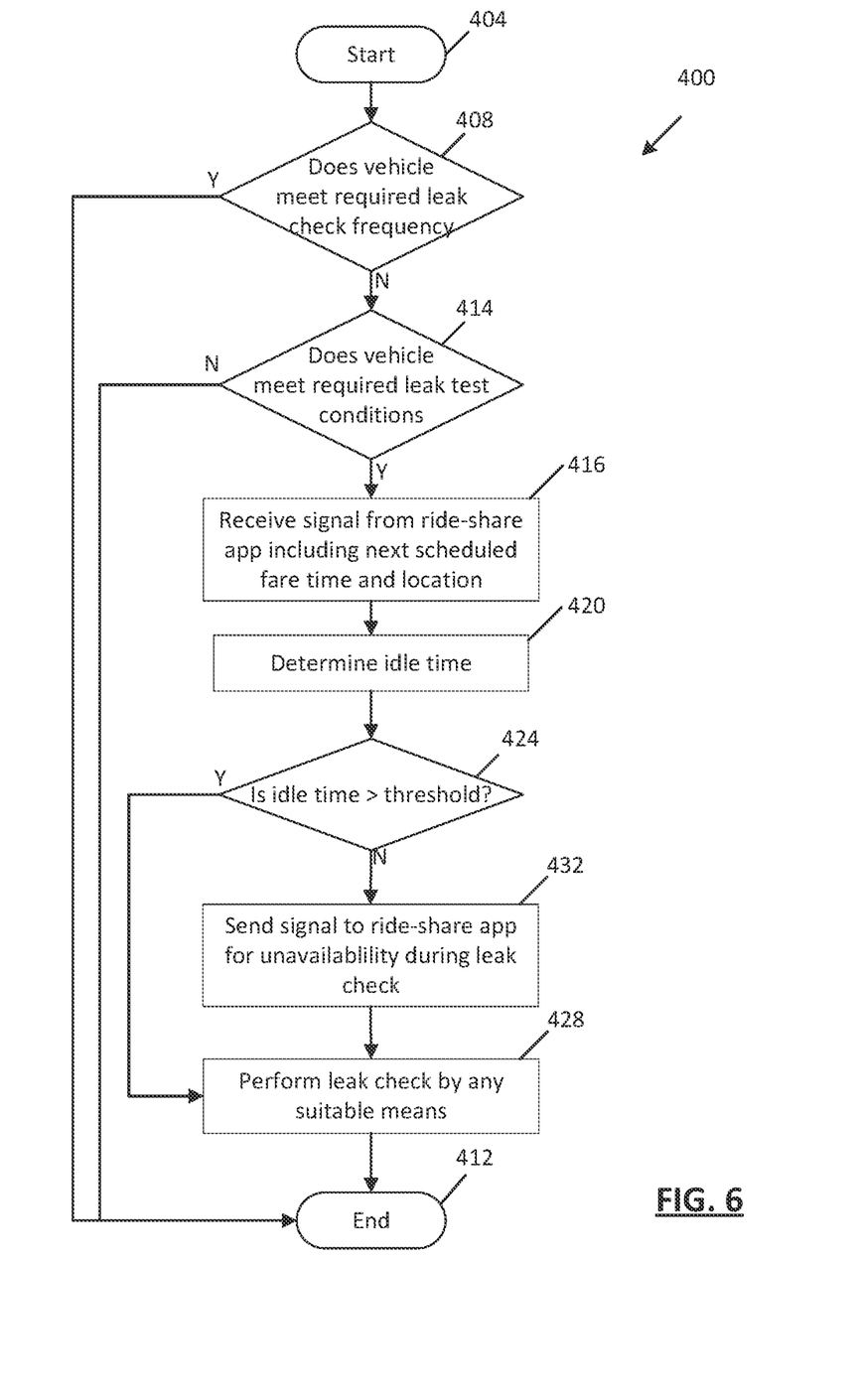
FIG. 6 is a flowchart for another example method of controlling the vehicle of FIG. 1.

Now referring to FIG. 6, an alternative example method 400 for performing a leak check is illustrated. Method 400 begins at 404. At 404, the vehicle 10 is keyed-off.

At 408, the controller 58 determines whether the vehicle 10 meets the required leak check frequency. For example, the required leak check frequency may be federally regulated, vehicle manufacturer regulated, or a combination of these. For example, the required leak check frequency may be 26% of qualifying trips (according to current CARB OBD2 regulations).

If true at 408, method 400 ends at 412. If false at 408, the method 400 determines whether the vehicle 10 meets the required small leak test conditions at 414. For example, the conditions may include: the fuel tank must be ½-¾ full, the ambient outside temperature must not be too hot or too cold (for example greater than 95° F. or less than 30° F.), the vehicle must have met engine cold start conditions (for example, sat overnight or for at least 8 hours without being driven; engine coolant temperature is less than or equal to 12° F. higher than ambient temperature, etc.), the vehicle must have been driven for a minimum number of minutes (for example 10 minutes) within a speed range (for example 45-65 mph), the components in the EVAP control system must be functioning normally, there must not be any fault codes, or a combination thereof. If false, method 400 ends at 412.

If true at 414, the method 400 may receive a signal from the ride-share application 22 indicating the next scheduled fare time and location at 416. For example, the controller 58 may communicate with the ride-share application 22 to determine the time and location of the next scheduled fare. The controller 58 may communication with the navigation system 18 to determine a route and drive time to the pickup location of the next scheduled fare.

At 420, method 400 may determine an idle time remaining before the next scheduled fare. For example, the idle time remaining may be the amount of time that the vehicle 10 may remain parked in the current location before needing to leave for the pickup location.

In an example scenario, the controller 58 may have received communications from the ride-share application 22 that the next fare is scheduled for pickup at a location 3 miles from the current location of the vehicle 10 in 35 minutes from the present time. The controller 58 may communicate with the navigation system 18 to determine that a shortest route to the pickup location takes 10 minutes. Thus, the idle time remaining may be approximately 25 minutes.

At 424, method 400 may determine whether the idle time is greater than a threshold time. For example, the controller 58 may compare the idle time remaining with a predetermined threshold. The predetermined threshold may be the required time for completing the small leak test. For example, the predetermined threshold may be 10 minutes or more. For example, the controller 58 may vary the predetermined threshold based on fuel level.

If true at 424, the method 400 may perform the leak check by any suitable means at 428. For example, the controller 58 may determine whether the vehicle has been shut down for a predetermined time (such as 30 minutes or more). If true, the controller 58 may restart the engine 38 and command the engine 38 to idle at a predetermined speed (for example, within a range of 400-800 RPM) for a predetermined idle time (for example, 10 minutes or more). If false, the controller 58 may keep the engine 38 shut down for the predetermined time and then restart the engine 38 and command the engine 38 to idle at the predetermined speed for the predetermined time. During the engine idle time, the controller 58 may execute the small leak test, as previously described.

If false at 424, a signal may be sent to the ride-share application 22 to make the vehicle 10 unavailable for the required leak check time. For example, the controller 58 may send a signal to the ride-share application 22 to either postpone the pickup time for a time that allows the small leak check to complete or deny the next scheduled fare for the vehicle 10.

The ride-share application 22 may make the determination of which option to select. For example, if the pickup time would be postponed by less than a threshold (for example less than 10 minutes), the ride-share application 22 may postpone the pickup time. If the pickup time would be postponed by 10 minutes or more, the ride-share application 22 may cancel the pickup for the vehicle 10 and reschedule for an available vehicle.

Considering (and adding to) our previous example, if the idle time remaining is approximately 25 minutes, and the vehicle has been shut down for 10 minutes, the vehicle 10 may require an additional 5 minutes over the idle time remaining to complete the small leak check (if the predetermined shut down time is 30 minutes and the predetermined idle time is 10 minutes). Thus, the controller 58 may send a signal to the ride-share application 22 indicating that an additional 5 minutes are required before pickup. Accordingly, the ride-share application 22 may either postpone the pickup time or reschedule the pickup.

At 428, the small leak test may be performed, as previously described.

Method 400 ends at 412.

The foregoing description of the embodiments has been provided for purposes of illustration and description. It is not intended to be exhaustive or to limit the disclosure, its application, or uses. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control system for a vehicle, the control system comprising:
a controller configured to receive output signals from a plurality of vehicle sensors, a vehicle communications system, a ride-share application, a navigation system, or a combination of these, the controller being configured to determine whether at least one of a plurality of conditions is met to execute a small leak test on a fuel system of the vehicle based on the signals, the plurality of conditions including an available time segment to execute the small leak test, a level surface, a smooth surface, and a constant vehicular momentum, wherein the controller is configured to execute the small leak test when the at least one of the plurality of conditions is met, wherein the controller is configured to receive the output signals from the plurality of vehicle sensors and determine whether the vehicle is level, and wherein if the vehicle is not level, the controller is configured to determine a new location that meets a predetermined location condition based on signals from the navigation system, the controller is configured to either control operation of the vehicle to drive the vehicle to the new location or send a communication to a vehicle operator to drive the vehicle to the new location, and the controller is configured to execute the small leak test when the vehicle is at the new location.

2. The control system of claim 1, wherein the controller is configured to receive the output signals from a vehicle communication sensor and determine whether a stop time of the vehicle exceeds a predetermined time threshold.

3. The control system of claim 2, wherein, when the stop time of the vehicle exceeds the predetermined time threshold, the controller is configured to execute the small leak test.

4. The control system of claim 2, wherein the output signals from the vehicle communication sensor indicate communication with a traffic light, a train stop, or a combination of these.

5. The control system of claim 2, wherein the output signals from the vehicle communication sensor indicate communication with an infrastructure, a network, a remote vehicle, or a combination of these.

6. The control system of claim 1, wherein the controller is configured to receive the output signals from the ride-share application and determine whether a stop time of the vehicle exceeds a predetermined time threshold.

7. The control system of claim 6, wherein, when the stop time of the vehicle exceeds the predetermined time threshold, the controller is configured to execute the small leak test.

8. The control system of claim 6, wherein, the output signals from the ride-share application indicate a pickup time and pickup location for a fare.

9. The control system of claim 8, wherein, when the stop time of the vehicle does not exceed the predetermined time threshold, the controller is configured to send a signal to the ride-share application indicating an extension for the pickup time.

10. A method for controlling a vehicle, the method comprising:

receiving, by a controller, output signals from a plurality of vehicle sensors, a vehicle communications system, a ride-share application, a navigation system, or a combination of these;

determining, by the controller, whether at least one of a plurality of conditions are met to execute a small leak test on a fuel system of the vehicle based on the output signals, the plurality of conditions including an available time segment to execute the small leak test, a level surface, a smooth surface, and a constant vehicular momentum;

executing, by the controller, the small leak test based on the at least one of the plurality of conditions being met to execute the small leak test;

determining, by the controller, whether the vehicle is level based on receiving output signals from the plurality of vehicle sensors;

determining, by the controller, a new location meeting a predetermined location condition based on signals from the navigation system;

either controlling, by the controller, operation of the vehicle to drive the vehicle to the new location or sending, by the controller, a communication to a vehicle operator to drive the vehicle to the new location; and executing, by the controller, the small leak test when the vehicle is at the new location.

11. The method of claim 10 further comprising:

determining, by the controller, whether a stop time of the vehicle exceeds a predetermined time threshold based on output signals from a vehicle communication sensor.

12. The method of claim 11, further comprising:

executing, by the controller, the small leak test when the stop time of the vehicle exceeds the predetermined time threshold.

13. The method of claim 11, wherein the output signals from the vehicle communication sensor indicate communication with a traffic light, a train stop, an infrastructure, a network, a remote vehicle, or a combination of these.

14. The method of claim 10, further comprising:

determining, by the controller, whether a stop time of the vehicle exceeds a predetermined time threshold based on output signals from the ride-share application;

and executing, by the controller, the small leak test when the stop time of the vehicle exceeds the predetermined time threshold.

15. The method of claim 14, wherein the output signals from the ride-share application indicate a pickup time and pickup location for a fare.

16. The method of claim 15, further comprising:

sending, by the controller, a signal to the ride-share application indicating an extension for the pickup time when the stop time of the vehicle does not exceed the predetermined time threshold.

* * * * *

UNITED STATES PATENT AND TRADEMARK OFFICE
CERTIFICATE OF CORRECTION

PATENT NO. : 11,333,570 B1
APPLICATION NO. : 17/217409
DATED : May 17, 2022
INVENTOR(S) : MacLennan et al.

Page 1 of 1

It is certified that error appears in the above-identified patent and that said Letters Patent is hereby corrected as shown below:

On the Title Page

Column 1, (22) Filed Line 1: After "2021", insert --(65) Prior Publication Data
US 2022/0146357 A1 May 12, 2022--

Signed and Sealed this
Second Day of August, 2022

Katherine Kelly Vidal
*Director of the United States Patent and Trademark Office*